United States Patent [19]

Vick

[11] Patent Number: 4,993,790
[45] Date of Patent: Feb. 19, 1991

[54] HOLOGRAPHIC LENTICULAR SCREEN STEREOSCOPIC AVOINICS DISPLAY APPARATUS

[75] Inventor: Gerald L. Vick, Mt. Vernon, Iowa

[73] Assignee: Rockwell International Corporation, El Segundo, Calif.

[21] Appl. No.: 499,241

[22] Filed: Mar. 26, 1990

[51] Int. Cl.$^5$ .............................................. G03H 1/04
[52] U.S. Cl. .................................. 350/3.73; 350/3.6; 350/3.76
[58] Field of Search ................. 350/3.73, 3.77, 3.85, 350/3.6, 3.76

[56] References Cited

U.S. PATENT DOCUMENTS

| | | |
|---|---|---|
| 3,613,539 | 10/1971 | Dudley . |
| 3,834,785 | 9/1974 | Kimura .............................. 350/3.73 |
| 4,701,005 | 10/1987 | Noguchi ............................ 350/3.73 |
| 4,807,978 | 2/1989 | Grinberg et al. .................. 350/3.73 |
| 4,930,847 | 6/1990 | Cederguist ........................ 350/3.6 |

Primary Examiner—Mark Hellner
Attorney, Agent, or Firm—Bruce C. Lutz; V. Lawrence Sewell; H. Fredrick Hamann

[57] ABSTRACT

Holographic techniques are utilized to create a lens or magnifying effect in a surface film. This surface film deflects the light rays so that they leave the film at a much different angle then they arrive at the film. Since holographically produced lenses are more efficient in the transmission mode at angles deviating substantially from near normal angles of incidence, the images to be displayed for the left eye of a viewer are substantially displaced from those images for the right eye of the viewer as opposed to the prior art presentation of holographic stereoscopic displays which positioned all of the left eye images immediately adjacent all of the right eye images for a given segment of the total picture.

15 Claims, 3 Drawing Sheets

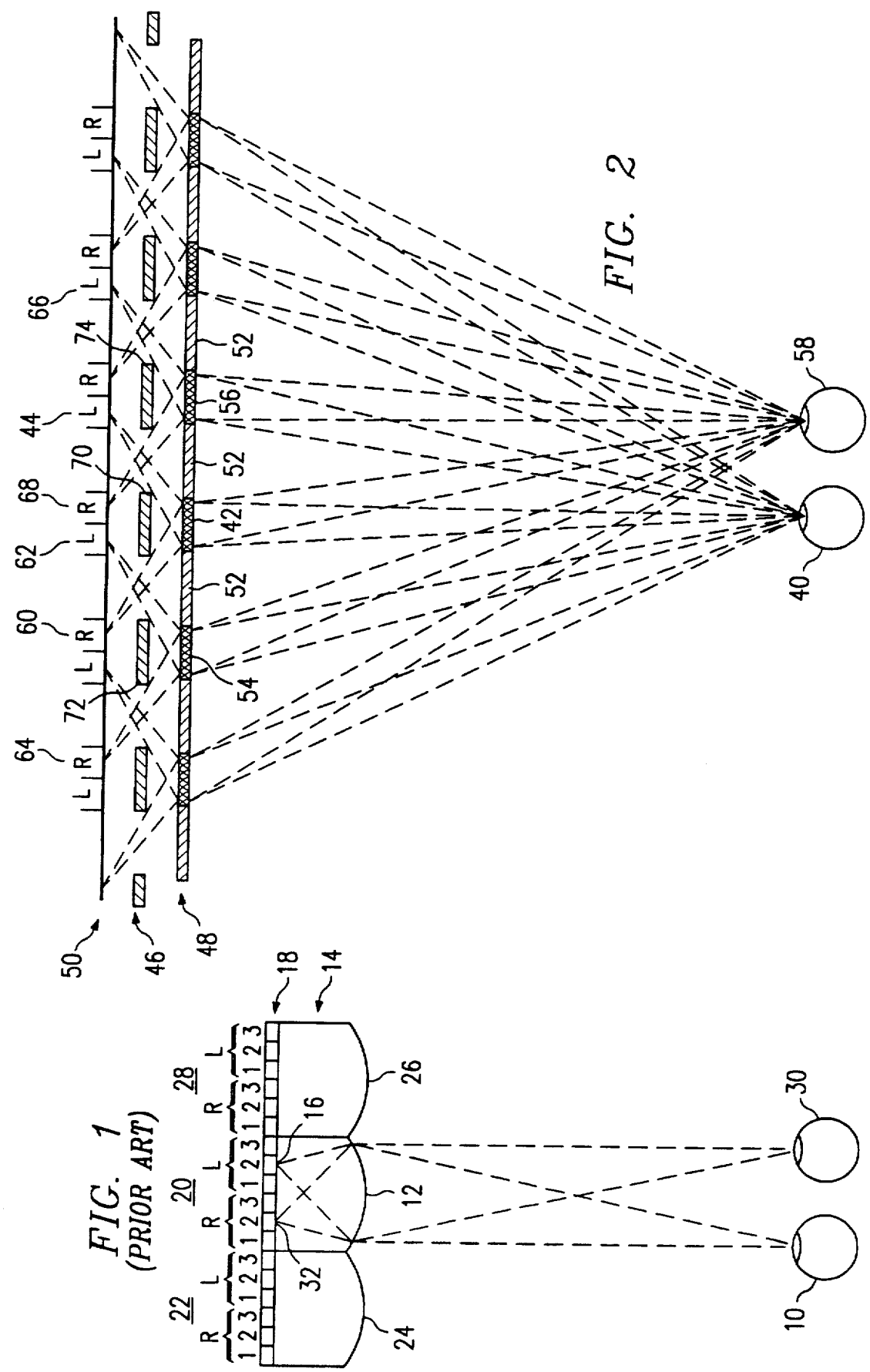

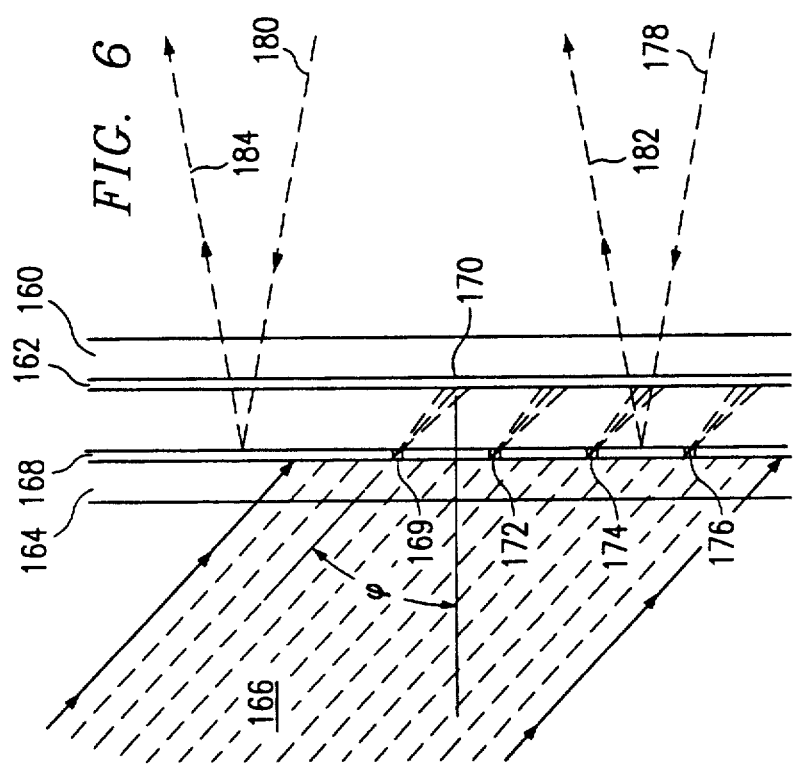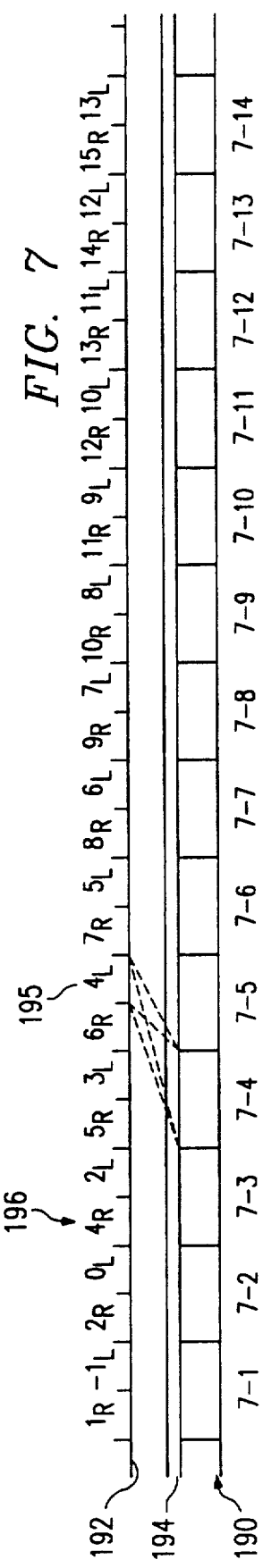

HOLOGRAPHIC LENTICULAR SCREEN STEREOSCOPIC AVOINICS DISPLAY APPARATUS

THE INVENTION

The present invention is concerned generally with avionics displays and more specifically with a stereoscopic display using holographic optic elements as the multi-lens surface whereby the lens surface is smooth for the purpose of applying anti-reflection coatings.

BACKGROUND

A conventional prior art lenticular sheet comprised an array of cylindrical glass or plastic lenses or lenticules placed over an image comprising strips of image sections running parallel to the axis of the cylindrical lenticule (lenslet). While the simplest of these use only two image strips for each lens, one for the right eye and one for the left eye viewing, some present day 3D cameras use four or more image strips for each of the left and right eye images per lenticule to provide a very sophisticated device with smooth apparent relative motion of objects in the scene as the viewing angle is changed. Instances are known of 3-D pictures with as many as 18 strips per eye.

This approach to the 3D effect while suitable for pictures and especially in low ambient light conditions, is not easily adaptable to a high ambient light situation such as in avionics display technology. Anti-reflective coatings need to be applied to display surfaces for use in avionics display viewing and the rough surface of the lenticules of the prior art prevent the use of such coatings.

The present invention attempts to produce the effect of lenses by using holographic techniques to generate an optic element lenticular screen having an array of lenses in a manner similar to that of the prior art. The exact same approach cannot be used since holographic optic element lenses are very inefficient in the transmission mode at high (near normal) angles of incidence. Thus, a majority of light would pass through these lenticules undeviated and left and right eye scenes would not be distinguishable from one another. The solution to this problem is provided in more detail in the following material where in one embodiment the holographic optic element (HOE) lenticules are physically separated from one another and filtering means is provided between the image display and the array of lenticules so that the only light rays which are received from the display by the lenticules are at an angle of incidence substantially removed from normal.

It is thus an object of the present invention to provide stereoscopic viewing of an image using holographic techniques.

It is a further object of the present invention to provide an array of holographic optic elements arranged in such a manner and in combination with filtering means to provide stereoscopic viewing of images to be viewed while providing a flat lens surface.

Other objects and advantages of the present invention will be ascertained from a reading of the specification and appended claims in conjunction with the drawings wherein:

FIG. 1 illustrates the prior art concept using cylindrical lenticules in an array;

FIG. 2 illustrates a viewing of the images through a slit plate-type filter;

Figure 3:
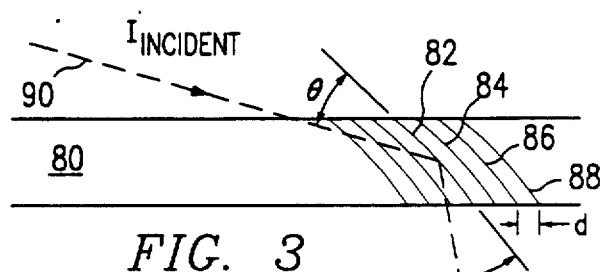
Figure 4:
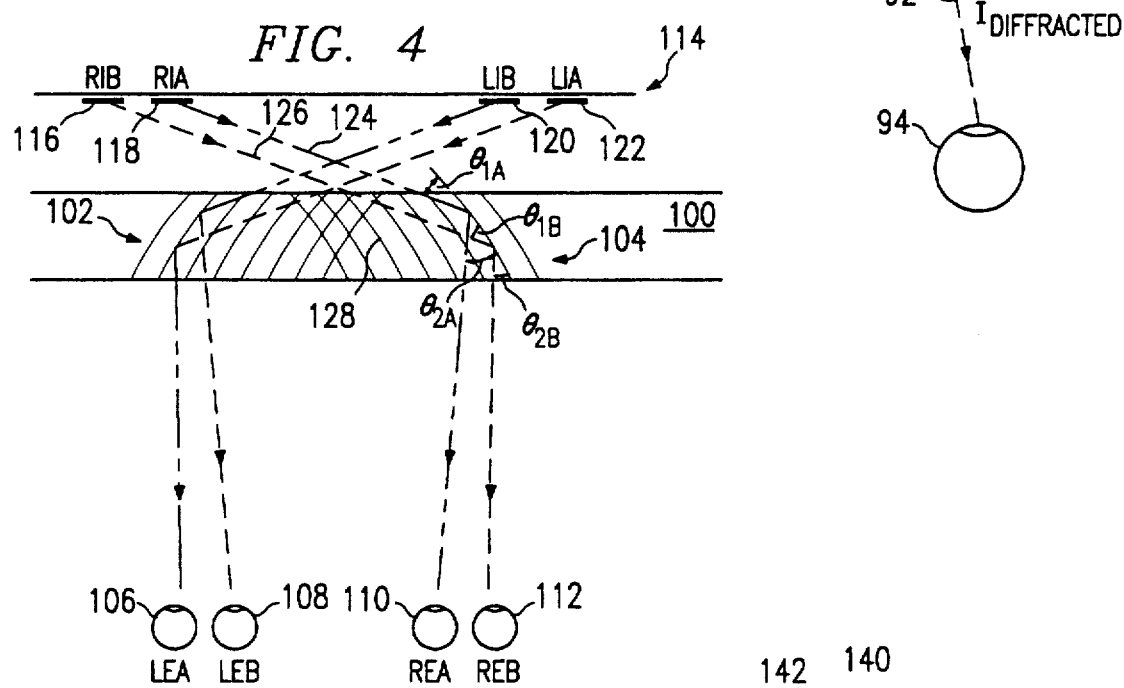
Figure 5:
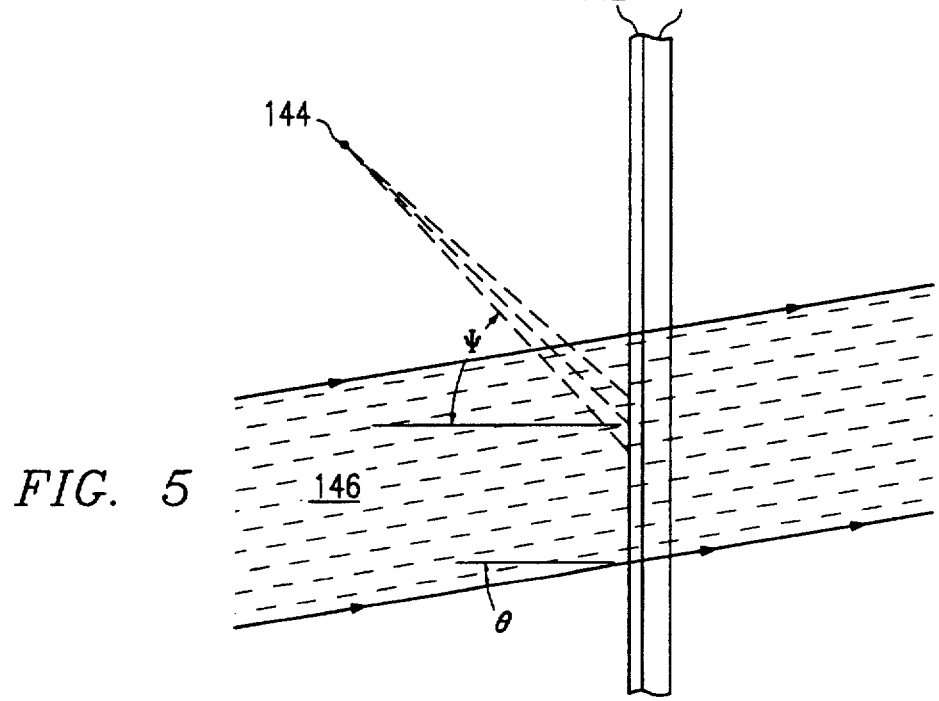

FIG. 3 provides an illustration of the Bragg plane diffraction of light rays through a holographic optic element;

FIG. 4 provides an amplification of the basics of FIG. 3 in showing two Bragg plane diffraction areas incorporated in a single lenticule so that left and right eye images can be detected from an image display;

FIG. 5 provides a presentation as to how a single lenticule incorporating the teachings of FIG. 3 may be generated in an HOE emulsion;

FIG. 6 shows a modification of FIG. 5 whereby multiple lenticules can be produced simultaneously; and FIG. 7 illustrates a construction of a lenticular screen where the density of the lens can be increased through the use of an angularly selective filter.

DETAILED DESCRIPTION

In FIG. 1 a left eye designated as 10 is viewing through a lenticule 12 of a set of lenticules generally designated as 14 a specific image segment 16 of a set of image segments generally designated as 18. Segment 16 is in a righthand portion of a set of segments generally designated as 20 and including both right and lefthand segments. An additional left and righthand set of segments generally designated as 22 is associated with a lenticule 24. A further lenticule 26 is associated with a set of left and righthand segments 28. A right eyeball 30 which would typically be spaced apart from the left eyeball 10 by approximately 2½ inches would view the corresponding right eye image which, in this case, is designated as 32 or image strip 2 in the lefthand section of the set of images 20. The viewer's brain in combination with the eyes 10 and 30 can accommodate viewing segments 2 in section 22 and using lenticule 24 as well as images 2 in section 28 corresponding with lenticule 26 at the same time to obtain an overall picture of the image being depicted. Segments 1 and 3 offer images of the same general picture from appropriately different angles to provide depth to the brian of the viewer observing the picture. This is a rough approximation of the prior art technology presently used for 3D photographs.

FIG. 2 uses a similar presentation to that of the prior art of FIG. 1 where the left eye, designated as 40, observes through a holographic optical element lens, designated as 42, a left eye image designated as 44. The image 44, in a described embodiment of the inventive concept, may comprises a display surface of a display instrument such as a cathode ray tube or other similar light emitting display products. The left eye 40 views the image 44 through one of many slits in a slit plate filter designated generally as 46. The filter 46 is situated between the holographic optic element lenticular plate, which is given a general designation of 48, and a display surface generally designated as 50. The holographic optic element lenticular plate 48 is comprised of sections of light blocking material such as 52 situated between each lenticule such as shown between lenticules 54, 44 and 56. A right eye designated as 58 is shown viewing a righthand image designated as 60 which would be the stereoscopic partner image to that designated as 44. Although the angles depicted for viewing the other areas are somewhat hard to follow. A closer observation will show that lenticule 54 allows viewing of a left eye segment 62 and a right eye segment 64. Lenticule 56, on the other hand, allows viewing by the observer of a left eye segment 66 and a right eye segment 68 by the viewer where segments 66 and 68 constitute an associated pair and segments 62 and 64 constitute an associated pair. In an attempt to reduce the complexity of the drawing of FIG. 2, the additional complications that would be introduced by trying to illustrate different angle images as shown in FIG. 1 have been eliminated from FIG. 2. However, the additional images to increase the viewer's feeling of depth of field are within the capabilities of the present invention and are not illustrated in an attempt to reduce potential confusion by the reader. It will be observed that the slit plate 46 has various sections or segments such as are designated by the designators 70, 72 and 74. In between the segments 70 and 72 is an open area through which light rays may pass as is the case between segments 70 and 74. Each of the segments such as 70 through 74 is situated between a lenticule such as 42 and the viewing image area such as that comprising a left eye segment(s) 62 and a right eye segment(s) 68. This placement of filter segments 70-74 is to prevent light rays from inappropriate images from reaching the viewer since light passes through a holographic optic element lenticule without appropriate focusing diffraction when it is received at an angle of incidence which is near normal. Thus, the purpose of filter or slit plate 46 is to prevent light rays from the surface of display 50 that are emitted at an angle of incidence near normal of the surface 50 from being supplied to the lenticule which is immediately adjacent that display surface as would be the case between the display surfaces comprising image segments 62 and 68 and the lenticule 42.

In FIG. 3 a holographic optic element generally designated at 80 is shown containing Bragg line planes such as 82, 84, 86 and 88. These Bragg line planes are slightly curved and as such, act to focus light and to retain focusing action over some reasonable range of eye motion left to right. A light ray designated as 90 is shown approaching the film 80 at an angle of incidence which deviates substantially from normal to the surface and which strikes the plane 82 at an angle (theta) $\theta$. This ray 90 is diffracted so that it leaves the plane at the same angle with which it strikes the plane and thus, the light ray is diffracted as a new light ray 92 on its way to a viewer's eye designated as 94. In typical uses of the inventive concept, the angle of light ray 92 would be reasonably close to normal of the surface 80 but in some instances could vary as much as 30 degrees from normal and still provide appropriate stereoscopic intelligence before the mind would receive information that the next set of images were being viewed.

In FIG. 4 a holographic optic element film is generally designated as 100 having an area containing a first set of Bragg lines 102 for focusing light rays to the left eye and a further set of superimposed Bragg lines generally designated as 104. A left eye view position A (LEA) is designated as 106 while a left eye position B (LEB) is designated as 108. A right eye position A (REA) is designated as 110 and corresponds with the left eye position A 106. A right eye position B (REB) is designated as 112. A display surface is generally designated as 114 and contains a right eye image position B (RIB) designated as 116 and a right eye image position A (RIA) designated as 118. A left eye image position B (LIB) is designated as 120 and a left eye image position A (LIB) is designated as 122. The light ray going from image 116 to right eyeball 112 is designated with symmetrical dashes while the light ray from 118 to eyeball 110 is shown as non-symmetrical dashes. Similar designation and differentiation is shown between image 120 and eyeball 108 and image 122 and eyeball 106. The ray from image 118 is further designated as 124 while the ray emanating from image 116 is designated as 126. The ray 124 strikes a set of Bragg planes designated as 128 at an angle $\theta$ 1A and leaves with respect to the Bragg plane at $\theta$ 2A. Typically, $\theta$ 1A will equal $\theta$ 2A. Ray 126 strikes the Bragg plane interface 128 at $\theta$ 1B and will leave at $\theta$ 2B. Again, $\theta$ 1B and $\theta$ 2B will typically be the same angle. $\theta$ 1A and $\theta$ 1B while being close to the same angle will actually typically be slightly different angles to accomplish the focusing action that is required. It should be further observed that while the rays are illustrated for purposes of discussion to all deflect off from the same Bragg plane, the actuality is that the rays will deflect off of all of the Bragg planes as a composite view and the viewer's brain will assimilate and coordinate the received information to provide an image. Further, while two superimposed sets of Bragg planes are illustrated for the images illustrated, a very large number of Bragg planes can be superimposed for various additional images in a manner somewhat analogous to that of the prior art FIG. 1.

In FIG. 5 an HOE substrate typically made of glass is labeled 140 while an emulsion is designated as 142. A point source of light is designated as 144 and this arrives at the emulsion 142 at an angle of incidence designated as (psi) $\psi$. A source of collimated light is designated generally as 146 and provides parallel light rays (collimated light) to the surface emulsion 142 at an angle $\theta$. Although this angle has been exaggerated so that it an be plainly seen that it is not at right angles to the surface, the angle of this light would be the viewing angle for one eye of the viewer for a given set of Bragg planes to be produced in the holographic lenticule being formed. Further sets of Bragg planes would require different angles for the collimated light 146 and different angles psi for the point source so as to focus light to the eye from different images situated on a display not presently shown in this Figure, but similar to that shown in previous FIGS. such as 2 through 4. While the lenticules required in a given display could be produced one at a time as shown in FIG. 5, it would be more efficient to produce a plurality of lenticules simultaneously.

In FIG. 6 an HOE substrate is given the designation of 160 while the HOE emulsion is designated as 162. A mask substrate is given a designation of 164 and would be a clear material so that light could pass through from a source 166. On the lower surface of the substrate 164, there is a reflective mask 168 containing slits so that the light from source 166 can shine through such as shown at slit 169 to effectuate a point source for the light 166 and produce the appropriate size lenticule at area 170 on HOE emulsion 162. The material 168 has additional slits such as 172, 174, and 176. The area between the slits such as 168 and 172 is comprised of reflective material so that parallel light or collimated light such as shown by rays 178 and 180 is for the most part reflected from the mask 168 and returned through the emulsion 162 in the form of rays such as designated by the designators 182 and 184. While the incident light will produce Bragg planes in the emulsion 162 wherever they coact with light coming through the slits such as 169, these Bragg planes will not detrimentally interfere with the desired focusing action of the Bragg planes produced by the reflected light such as represented by light rays 182 and 184. The Bragg planes produced by the reflected light rays are used to view one set of images. The angle of both of the light source rays 178 and 180 as well as the angle of the light coming through the slits will have to be reversed to the opposite set of angles for the views for the other eye. The two sets of images for the right and left eye would be required to obtain the desired stereoscopic effect. Thus, while the illustration of FIG. 6 is a substantial improvement over that of FIG. 5, there are still multiple exposures required to produce the lenslet or lenticule at a position such as 170 which will provide the desired diffraction of light rays from a display surface and the various images produced thereon to the viewer's eyes as would be used in the finished product.

In FIG. 7 an HOE emulsion is designated as 190 and includes lenses numbered 7-1 through 7-14. Rather than being separated as shown in the FIG. 2, the lenses are shown as substantially adjacent each other. Between a display surface 192 and the emulsion 190, there is an angularly selective filter 194. This filter may be a rugate filter such as shown in my patent application, Docket No. 85CR062, and application Ser. No. 093,844, filed the 4th of Sept., 1987, and assigned to the same assignee as the present invention. As is shown on the image plate or display surface 192, the area on the display plate 192 is correlated with the various lenses on emulsion 190. In other words, the area on plate 192 marked 4L is the area for images to be observed through the lens 7-4 by the left eye. Light rays are shown from each edge of the lens 7-4 to the appropriate edges of the image areas defining 4L. An image area 4R is further designated by a designator 196 and shows the area for viewing by the right eye. Between the image areas 195 and 196 are areas for images for lenses 2, 5, 3 and 6 as illustrated. The angular selectively of filter 194 eliminates the requirements for the slit-type filter such as shown and described in FIG. 2 but in effect both of these filters perform the function of angular selectivity of the rays from the display such as 192 and as received by the lenses 190. Thus, either a rugate filter or a slit plate or any of other angularly selective filters may be used as selected by the designer of a finished product.

OPERATION

A lenticular screen many be appropriately defined as a screen comprising an array of lenticules or lens-type devices. As defined in the present inventive concept, the lenticules are actually sections of a holographic optic element emulsion which has been photographically processed using lightwaves of the proper wavelength such as laser light to define diffraction planes in the emulsion whereby light rays from an image can be focused to a viewer's eye. The holographic process enables many sets of Bragg planes to be superimposed so that different images are viewed at different viewing angles and a given lenticule or lenslet area can provide image information for both eyes of the viewer simultaneously.

Although the advantages of stereoscopic viewing of some aircraft displays such as those involving a display of any objects in the surrounding environment will be obvious without further explanation, prior art attempts to provide stereoscopic viewing have typically involved either the use of mirrors or required the viewer to wear goggles or glasses. The advantage of a lenticular screen is that such goggles or glasses are not required and the hazards of mirrors in a cockpit is eliminated. Further a lenticular screen minimizes any restriction as to the amount of emerging light. By keeping images within the correct depth range for a given viewing distance, the correct binocular cues can be given to the viewer's eyes thereby eliminating the problem of eye strain and headaches which is a common complaint of viewer's of 3D displays. Further, a lenticular screen is relatively thin and inconspicuous as compared to some prior art attempts at stereoscopic display.

The present invention is directed toward a lenticular screen which is flat through the use of the holographically processed emulsion and thus, anti-reflective coatings can be easily applied to enhance viewing under the high ambient light conditions often prevailing in an airplane cockpit.

As is well-known, what a viewer sees is determined by ocular factors, the brain and psychological factors (such as expectance), and other physiological sensors and factors. Among these ocular factors, retinal disparity, convergence and accommodation are binocular cues which are essential to have a realistic 3D view on which the eyes may focus. A lenticular screen can allow stereoscopic vision of an image being transmitted therethrough when the design of the lenticular screen is such that the focal plane for the lenticule is placed at the proper distance from the lenticule. The light from any point of information will be specifically directed from the display in parallel rays. To obtain stereoscopic vision, each lens must be associated with at least one right eye and one left eye view positioned in such a manner that the light from each view will go to the appropriate eye. With the correct setup, a very realistic image can be obtained with the correct binocular cues.

Although for most lenticular screen displays, there are typically a plurality of viewing zones, as the viewer moves in a direction parallel to the lenticular screen, he will move in and out of the correct viewing zones. Movement out of these zones causes the viewer to see either an inverse stereoscopic view or a monoscopic view. Most stereoscopic displays should be viewed only within a prescribed view zone.

As mentioned previously, the lenticular sheet 14 of FIG. 1 is a prior art approach to stereoscopic viewing. The lenticular sheet 14 comprises an array of cylindrical lenses with the image 18 arranged in strips running parallel to the axis of the cylindrical lenticules such as 24. The thickness of the lenticular sheet 14 is such that the back of the sheet places the images at the focal point of the lenses. The simplest and cheapest of these devices uses only two image strips for each lens, one for the left eye and one for the right eye viewing. This gives a 3D image but the image does not change as the position of the eyes changes. Hence, one cannot "look behind" objects in the foreground. A more sophisticated approach uses several image strips such as the three image strips shown in FIG. 1. With the additional image strips, the image appears to change as the viewer's eyes move from left to right. In theory, the number of strips behind each lens could increase to the limit of the resolution of the eye which would give perfectly smooth apparent relative motion of the objects in the scene. In practice, pictures with only four strips per lens show remarkably smooth relative motion. As mentioned above, however, there is a limit to the extent upon which the eye may be moved before a given lens begins to focus on the image strip of an adjacent lens thus producing the viewing of double images or inverse images.

Although one skilled in the art of lenticular screens and stereoscopic images might believe that a holographic optic element lenticular screen could be used as a direct replacement of an array of circular cylindrical lenses, this will not work. Holographic optic element lens are very inefficient in transmission at near normal angles of incidence. The majority of light from such a display would pass through undeviated and right and left eye scenes would not be distinguished from each other. The present invention overcomes this problem through the use of a filter between the holographic optic element lenticular screen and the display which screen provides angularly selective control of the light rays passing from the display to the lenses. One such type of angularly selective filter is the slit plate 46 of FIG. 2. As illustrated, the width of the slits is such that an area between slits designated as 70 prevents any of the light rays from the left and right image areas 62 and 68 from passing to lenticule 42 of the lenticular plate 48. However, the lenticule 42 is designed such that it will focus rays from the right image 60 (or set of images) and from the left eye image 44 through the slit areas in the slit plate 46. These lenses serve two functions. One, they deflect the light to the appropriate angle such that the right eye views the right eye image and the left eye views the left eye image and also, they provide lateral magnification to cause the right and left eye image each to appear to fill all or nearly all of the viewing area. As will be noted, there are areas such as 52 between the lenticules which do not allow the passage of light. These areas 52 are generally the approximate width of the slits in the slit plate 46. If the design of the total apparatus requires so many images that the entire image display 50 is filled with left and right eye images, the areas 52 of plate 48 will prevent the rays from these additional images areas from exiting the display area at a normal angle of incidence.

A potential alternative to that of FIG. 2 is to move the display 50 to the left or right by an amount such that the display areas are directly aligned with the blank areas 52 and thus, in effect, make the slit plate 46 integral with the lenticular plate 48. This embodiment is not specifically illustrated because it is believed an obvious extension of the illustration of FIG. 2 and thus, such an illustration would serve no useful purpose.

A holographic lens or lenticule is essentially a specialized diffraction grating constructed such that the deflection of various light rays results in a focusing effect. While various types of holographic optic elements will provide workable apparatus, the preferred embodiment of my invention uses a volume hologram process with a grating realized as periodic variations in an emulsion (or, in other words, a phase-type hologram).

As shown in FIG. 3, the hologram has a grating spacing of d. The light rays such as 90 are incident at an angle $\theta$ relative to the grating. The Bragg condition, $2d \sin \theta =$ lambda determines the direction at which the diffracted light emerges where lambda is the wavelength of the light comprising ray 90. Although for the purposes of illustration, a single light ray is shown, in actuality, a plurality of light rays from a given image would be deflected off from a plurality of Bragg lines such as 82 through 88 with the angle $\theta$ being slightly different for each one so that the net effect is a focusing action to provide the various light rays to the viewer's eye.

FIG. 4 illustrates a double exposure hologram having one set of gratings 102 that will focus the left eye scene at the left eye and one set of gratings 104 that will focus the right eye scene at the right eye. The two grating are shown spacially separated except for a small area of overlap. In an actual (or real) hologram, the two gratings would overlap over the entire hologram or lenticule. The grating planes are shown as curved lines although the curve has been exaggerated for purposes of illustration. The amount of curvature depends upon the distance of the point source of light from the emulsion at the time of generation of the hologram and the wavelength of the laser light being used in both the point source and the collimated light. The curvature of the grating planes allows the focusing of the light and the ability to retain the focusing action over some reasonable range of eye motion left and right. This is illustrated to some extent in FIG. 4 by showing positions A and B for the right and left eyes of the viewer.

As indicated in the Detailed Description, FIG. 5 illustrates how a holographic lenticule can be produced in emulsion 142 using a point source of light 144 and a collimated light source shown as 146. Since many lenticules are required, not only for each eye, but for each view of an image, the approach taken by FIG. 5 would require a great number of iterations.

FIG. 6 illustrates how the focusing action of multiple lenticules can be generated at one time by using a mask to produce multiple point sources of light. This approach to providing multiple light sources would interfere with light being generated from the same direction as shown in FIG. 5 and thus, the approach taken in FIG. 6 is to generate the collimated light from the opposite side of the holographic film 162 with the realization that any gratings or Bragg planes produced as the collimated light rays from 178 to 180 pass through holographic film 162 on the way to reflector 168 while interacting with the point sources will not interfere with the further Bragg planes produced upon the return path shown from 182 to 184 if a proper selection of viewing angles is made.

FIG. 7 merely illustrates that other types of angularly selective filters, such as a rugate filter, may be provided to prevent light rays from images directly beneath a lenticule from passing through that lenticule or other inappropriate lenticules without being diffracted at the proper angle to the viewer.

While I have disclosed only a couple variations of a holographic display and a couple ways to generated the holographic lenticules in an emulsion film, I wish to be limited not by the specific approaches illustrated, but only by the scope of the appended claims wherein I claim:

1. The method of producing a 3-D display for use in an avionics environment comprising the steps of:
 presenting a series of sets of left and right eye images on a display medium where the left and right eye images of a set are separated by at least one image of another set;
 focusing light rays, occurring within a predetermined range of viewing angles that deviate from normal to a plane defined by a set of images, through a transmission medium from said left and right eye images as a set of light focusing areas; and
 filtering light rays to prevent passage thereof, in a direction normal said transmission medium, through a given focusing area to the images of said display.

2. The method of producing a 3-D display for use in an avionics environment comprising the steps of:

generating a series of columnar images comprising sets of left and right eye images on a display where the left and right eye images of a set are separated by at least one image of another set;

filtering the output of said display to prevent passage of light rays from said display which strike an attached filter at substantially normal incidence to said filter; and focusing light rays from said sets of left and right eye images to produce a stereoscopic effect to a viewer.

3. Apparatus for providing a 3- D avionics display comprising, in combination:

display means for providing sets of left and right eye display areas where the left and right eye display areas of a set are physically separated by at least one left eye display area and one right eye display area belonging to other sets;

multilens holographic optic element (HOE) means for focusing light rays from sets of associated display areas where each lens in the HOE operates to focus the light rays of a single given set of left eye and right eye display areas; and filter means intermediate said display means and said HOE means for preventing passage of light rays from said display means to said HOE means when the light rays would be received by said HOE means at a near normal angle of incidence.

4. Appartus as claimed in claim 3 wherein said filter means comprises selective angle mirroring material and operates to keep said display means and said HOE means in close proximity.

5. Appartus as claimed in claim 3 wherein said filter means comprises spatially selective slit type filter material and operates to keep said display means and said HOE means in close proximity.

6. Apparatus for displaying stereoscopic information for use in an avionics environment comprising:

a. display means for presenting sets of left and right eye image strips wherein a given set of left and right eye image strips are physically separated by image strips of other left and right eye sets;

b. angularly selective filter means, disposed outwardly of said display means, for preventing the passage of light rays outwardly from the surface of the display means in a direction normal to the surface of the display means; and c. holographic optic element (HOE) lenticular lens means, disposed outwardly of said filter means, for receiving and deflecting light rays from each set of left and right eye image strips of said display means through a predetermined lens element of said HOE toward a viewer to provide a stereoscopic view effect.

7. Apparatus for displaying avionics environment type stereoscopic information comprising:

a. display means for presenting sets of left and right eye images wherein a given set of left and right eye images are physically separated by image strips of other left and right eye sets;

b. filter means, disposed outwardly of said display means, for preventing the passage of light rays outwardly from the surface of the display means to a viewer in a direction normal to the surface of the display means; and c. holographic optic element (HOE) lens means, disposed outwardly of said filter means, for receiving and deflecting light rays from each set of left and right eye images of said display means through a predetermined lens element of said HOE toward said viewer to provide a stereoscopic view effect.

8. Apparatus for displaying avionics environment type stereoscopic information while providing a smooth display surface comprising:

a. display means for presenting sets of left and right eye images;

b. filter means, disposed outwardly of said display means, for preventing the passage of light rays outwardly from the surface of the display means to a viewer in a direction normal to the surface of the display means; and c. a film comprising sets of holographic optic element (HOE) lens means, disposed outwardly of said filter means, for receiving and deflecting light rays from each set of left and right eye images of said display means through a predetermined lens element of said HOE toward said viewer to provide a stereoscopic view effect.

9. Apparatus for displaying avionics environment type stereoscopic information while providing a smooth display surface comprising:

a. display means for presenting sets of left and right eye images;

b. filter means, disposed outwardly of said display means, for preventing the passage of light rays outwardly from the surface of the display means to a viewer in a direction normal to the surface of the display means; and c. a film comprising sets of pairs of superimposed Bragg plane forming holographic optic element (HOE) lens means, disposed outwardly of said filter means, for receiving and deflecting light rays from each set of left and right eye images toward said viewer to provide a stereoscopic view effect.

10. The method of producing a lenticule in a holographic film comprising the steps of:

a. passing collimated light through a holographic film from a first surface to an opposite side second surface at an viewing angle theta for a given eye of a viewer;

b. exposing said holographic film with light passing through said film from said first surface to said second surface from a point source of light located a distance D from the film and at an angle psi, where $$D = R_o R_r / (R_r - R_o) \quad (1)$$

$$R_r = d / \cos(\text{psi}) \quad (2)$$

$R_o$ = intended viewing distance;

d = distance from the film lens to an associated underlying image to be viewed (viewing plate);

Psi = a predeterminable angle at which the resulting Bragg planes will deflect light rays to allow viewing of said associated underlying image when viewed at angle theta; and c. repeating steps (a.) and (b.) using negative values of angles for psi and theta as compared to those used previously.

11. The method of producing a lenticule in a holographic film comprising the steps of:

a. passing collimated light through a holographic film from a first surface to an opposite side second surface at an viewing angle theta for a given eye of a viewer;

b. exposing said holographic film with point source light passing through said film from said first surface to said second surface from a point source located at an angle psi relative a normal to the lenticule which corresponds to the angle between a normal to the lens and the imagary to be viewed; and c. repeating steps (a.) and (b.) using negative values of angles for psi and theta as compared to those used previously.

12. A stereoscopic holographic lenticule comprising, in combination:

holographic optic element substrate; and holographic film disposed on said substrate and including oppositely disposed Bragg planes whereby right and left images may be viewed simultaneously.

13. The method of producing a plurality of columnar lenticules in a volume/phase processed holographic film comprising the steps of:

a. exposing a holographic film with multiple point light sources by passing collimated light, having an angle psi relative a normal to the film, through a reflective mask having a plurality of slits through said film where the reflective mask is a distance D from the film and D is a typical viewing distance of one using the lenticules;

b. passing collimated light through said holographic film to reflect off said reflective mask and again pass through said holographic film at a viewing angle theta for a given eye of a viewer; and c. repeating steps (a.) and (b.) using negative values of angles for psi and theta as compared to those used previously.

14. Holographic lenticules for use in stereoscopic viewing produced by the process of:

a. passing collimated light through a holographic film from a first surface to an opposite side second surface at an viewing angle theta for a given eye of a viewer;

b. exposing said holographic film with point source light passing through said film from said first surface to said second surface from a point source located at an angle psi relative a normal to the lenticule which corresponds to the angle between a normal to the lens and an image to be viewed; and c. repeating steps (a.) and (b.) using negative values of angles for psi and theta as compared to those used previously.

15. A holographic lenticule for use in stereoscopic viewing produced by the process of:

a. passing collimated light through a holographic film from a first surface to an opposite side second surface at a predetermined viewing angle for a given eye of a viewer;

b. exposing said holographic film with point source light passing through said film from said first surface to said second surface to produce a first set of Bragg plane diffraction surfaces for focusing light rays received from a first image; and c. repeating steps (a.) and (b.) to superimpose a second set of Bragg plane diffraction surfaces upon said first set of Bragg plane diffraction surfaces whereby light rays received from a second image are focused toward the other eye of the viewer.

* * * * *